United States Patent Office 3,459,488
Patented Aug. 5, 1969

3,459,488
FLASHBULB AND ATTACHMENT FOR CAMERA
Johann Schröder, Aachen, Germany, and Louis Marius Nijland, Emmasingel, Eindhoven, Netherlands, assignors, by mesne assignments, to U.S. Philips Corporation, New York, N.Y., a corporation of Delaware
Filed Apr. 3, 1967, Ser. No. 628,091
Claims priority, application Netherlands, Apr. 2, 1966, 6604442
Int. Cl. F21k 5/02
U.S. Cl. 431—95     8 Claims

ABSTRACT OF THE DISCLOSURE

A flashbulb includes three current-supply elements with the filament secured between the first and second elements, and a globule of paste secured between the first and third elements. Upon ignition of the filament the bulb flashes producing actinic light. Reacting from either the evolved actinic light or heat the paste globule dissociates becoming an electrically conductive bridge between the first and third elements, which bridge operates as a switch for ignition of an adjacent similar flashbulb.

---

This invention relates to flashlight lamps or flashbulbs in which, after ignition, a chemical reaction takes place during which actinic light is radiated.

An object of the invention is to provide a flashlight lamp suitable for use in a magazine in which a plurality of such lamps are electrically connected together and in which the ignition of one lamp establishes a current bridge in the electrical circuit, thus permitting ignition of the subsequent lamp. Such magazines are electrically connected to the flash lamp contact on a camera. When the film is exposed, one of the lamps from the magazine is ignited, radiates actinic light and closes a current bridge, causing a subsequent flash lamp to be ignited when the shutter of the camera is released again.

In known magazines per se, the current bridge is closed outside the lamps. However, such constructions do not always possess sufficient reliability. An object of the present invention is to overcome this disadvantage. According to the invention, a high extent of reliability is obtainable with a flashlight lamp having three current-supply conductors, two of which form part of the igniting mechanism present in the lamp and the third of which is connected to one of the other supply conductors by means of a paste provided within the lamp, the paste containing at least one metal compound which dissociates by the action of either heat evolved during the actinic reaction, or radiated light, or both of them, the paste then establishing an electrically conductive connection between these current supply conductors. When the lamp flashes up after the ignition, the metal compound is dissociated and establishes an electrical connection between the third current supply conductor and one of the other current supply conductors.

Magazines including lamps according to the invention are more reliable than those in which the current bridge is closed outside the lamp. In the latter case less energy per square centimeter of contact surface is available for this purpose than within the lamp. Consequently a more sensitive mechanism is required if a contact is closed outside the lamp. However, such a mechanism is also highly sensitive to damage of chemical, mechanical, thermal and optical nature. It is furthermore less resistant to injudicious use.

In order that the invention may be readily carried into effect, it will now be described in detail, by way of example, with reference to the accompanying diagrammatic drawing showing one possible embodiment of lamps according to the invention and the electrical circuit of which such lamp may form part in a magazine.

Figure 1A:
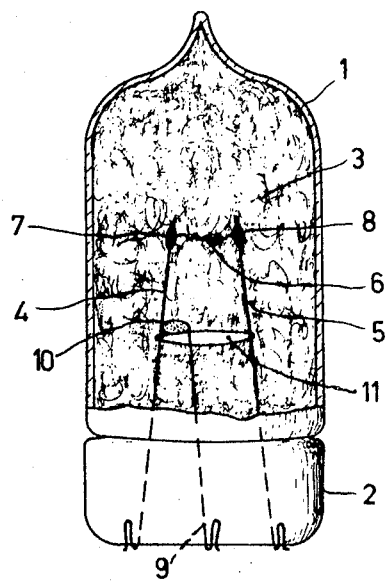
Figure 1B:
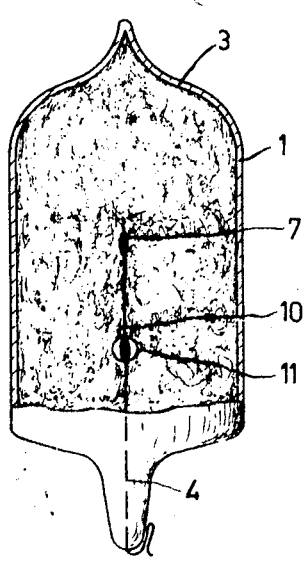
Figure 2:
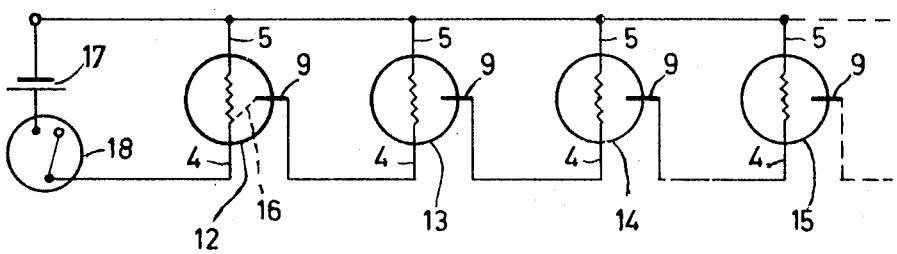

FIGURE 1a is a sectional view of one embodiment of a lamp according to the invention;
FIGURE 1b is a sectional view at right angles to that of FIGURE 1a, and
FIGURE 2 shows a diagram of an electrical circuit.

The flashlight lamp of FIGURE 1a comprises a transparent cylindrical bulb 1 of, for example, glass, which may be externally covered with at least one lacquer layer (not shown), and a flat pinch 2 which can be inserted into a holder. The bulb contains a metal wool 3, for example zirconium, and a gas, for example oxygen or a volatile fluorine compound, which reacts with it after ignition. In the bulb also an igniting mechanism is present which, in the embodiment shown, comprises current-supply conductors 4 and 5 connected together by a filament 6 of, for example, tungsten. The end of the current-supply conductors 4 and 5 carry pellets 7 and 8 of an igniting paste which, when heated by the filament, explode and initiate the reaction between the metal wool 3 and the gas filling, which produces the actinic light.

According to the invention the lamp contains a third current-supply conductor 9 which is connected to one of the other current-supply conductors, in this example the one indicated by 4, by a globule or quantity of paste 10 containing a rare metal compound. The current-supply conductors 4, 5 and 9 are relatively fixed by means of a glass bead 11, which may be provided with a leak indicator (not shown).

When the filament 6 is electrically heated to incandescence, the pellets 7 and 8 explode and the reaction between the metal wool and the gas filling is initiated. By the action of either the heat evolved or the radiated actinic light, or both, the rare metal compound in the paste 10 is dissociated and the current-supply conductors 4 and 9 are electrically connected to each other by a current bridge of rare metal.

If a plurality of such lamps are connected into a circuit the diagram of which is shown in FIGURE 2, in which the current-supply conductor 9 is invariably connected to the current-supply conductor 4 of the subsequent lamp, this subsequent lamp 13 can be ignited only after ignition of the first lamp 12 and the formation of a current bridge in this lamp (shown in broken line at 16). The lamp 14 can be ignited only after ignition of the lamp 13, and so forth. It will be evident that an unlimited number of lamps may be included in the electrical circuit in the manner described.

The diagram of FIGURE 2 includes a current source 17 and a switch 18 for operating the circuit. The switch 18 is coupled to the exposure system of the camera. The current source 17, namely a battery, a piezo-electric crystal, a dynamo or any other suitable current source may be present either within or on the camera or within the magazine.

The invention is naturally not limited to the construction of the lamp shown in FIGURES 1a and 1b. This construction is independent of the kind of the combustion reaction. Instead of a metal wool and a gas reacting therewith, the lamp may contain, for example, a mixture of two gases which are able to react with each other. The ignition may take place, for example, with the aid of a thin wire 6 consisting of a metal which is combustible in the gaseous atmosphere, for example, zirconium in oxygen, so that in this case no igniting paste is required.

As an alternative, the igniting paste may be caused to explode by means of a spark bridge, the current-supply conductors then not being connected together by a filament 6. A lamp containing a mixture of reactive gases which is suitable for the purpose can be ignited by a spark bridge alone and an igniting paste need not then be present on the igniting mechanism.

The paste present between the current-supply conductors 4 and 9 comprises a mass which has no electric conductivity but which becomes electrically conductive by dissociation of one or more of its components by the action of heat and/or light. For this purpose use can only be made of compounds of metals which, under conditions which prevail in the lamp upon combustion, are not converted into compounds having poor electric conductivity, such as many oxides and all fluorides. So these are especially rare metals. Preferably use is made of compounds of silver, such as silver oxalate, silver lactate and silver citrate, and further silver nitrate, silver carbonate or silver chlorate. The mass may also contain a binder, for example, nitrocellulose, a solvent such as butyl acetate or ethyl acetate, and a flow promoting agent which may be a metal fluoride, a metal phosphate or a metal borate. To indicate the presence of the paste it is possible to add an intensely coloured or black substance, preferably a good conductor of electricity such as, for example, silver powder or graphite powder. A suspension of suitable viscosity and surface tension is formed from the said substances by any method generally used. The composition desired may be determined in a simple manner. In the majority of cases at least one drop of the suspension, so far it is provided on a suitable component of the lamp, for example, on the glass bead, and then dried, suffices to obtain the desired effect.

In certain cases no binder is required. This is the case, for example, with an intimate mixture consisting of

| | Parts by weight |
|---|---|
| Silver lactate | 92 |
| Silver oxalate | 7.7 |
| Graphite | 0.2 |
| Silver fluoride | 0.1 | which is stirred with ethanol to form a paste having the desired rheological properties. If desired, a small amount of binder may naturally be added to such a mixture.

Lamps according to the invention may be placed in a magazine of arbitrary shape, which may possess, for example, a fastening member for placing it on a camera. The magazine may also include a cable for connecting the electrical circuit to the switch present within the camera.

What is claimed is:

1. A flash lamp adapted to be ignited to cause radiation of actinic light comprising a sealed bulb, an igniting mechanism mounted in said bulb, at least three current supply conductors in said lamp, and a globule of paste provided within said bulb containing at least one metal compound which dissociates to form an electrical conductor as a result of the radiation of actnic light, two of said current supply conductors forming part of said igniting mechanism and the third current supply conductor being mechanically connected to one of the other current supply conductors by means of said paste and electrically connected when the lamp is flashed.

2. A flash lamp as claimed in claim 1 wherein said paste contains at least one rare metal compound.

3. A flash lamp as claimed in claim 1 wherein said paste contains at least one silver compound.

4. A flash lamp as claimed in claim 1 wherein said paste contains at least one silver compound selected from the group consisting of silver oxalate, silver lactate and silver citrate.

5. A flash lamp as claimed in claim 1 wherein said paste contains a colored substance for indicating the presence of the paste.

6. A plurality of flash lamps as defined in claim 1, for use in a magazine, and circuit means electrically connecting said lamps such that operation of one renders only one other lamp operable.

7. A plurality of flash lamps in a magazine as defined in claim 6 in combination with a flash camera having means operatively connected to said circuit means of the flash lamps, for operating said lamps sequentially.

8. A flash unit comprising:
 (a) a base,
 (b) a plurality of ignitable flash lamps carried by the base, each lamp comprising a sealed bulb and including therein ignition means having first and second current supply wires bridged by a filament and a third wire electrically connectible to said first supply wire, each of the three wires having one end extending outside the bulb,
 (c) first circuit means for electrically connecting the second current supply wires of each lamp,
 (d) second circuit means for electrically connecting the third wire in each lamp to the first current supply wire of an adjacent lamp, and
 (e) junction means within each bulb comprising light-sensitive mass that is mechanically joined to said first and third wires but initially is non-electrically conductive between them, said mass becoming electrically conductive upon ignition of the bulb as an actinic reaction thereto and automatically electrically connecting said first and third wires within the bulb, whereby the adjacent bulb is connected for subsequent ignition.

References Cited

UNITED STATES PATENTS

| 2,290,309 | 7/1942 | Aquilla | 431—93 |
| 2,725,821 | 12/1955 | Coleman. | |

FOREIGN PATENTS

| 12,315 | of 1886 | Great Britain. |
| 1,192,047 | 4/1965 | Germany. |

JAMES W. WESTHAVER, Primary Examiner

U.S. Cl. X.R.

95—11; 240—1